United States Patent

[11] 3,582,737

[72] Inventors Herbert J. Brown
Scotia;
George M. Rosenberry, Jr., Schenectady, both of, N.Y.
[21] Appl. No. 866,103
[22] Filed Oct. 7, 1969
[45] Patented June 1, 1971
[73] Assignee General Electric Company
Continuation of application Ser. No. 620,123, Mar. 2, 1967, now abandoned. This application Oct. 7, 1969, Ser. No. 866,103

[54] SPEED CONTROL OF A WYE-CONNECTED INDUCTION MOTOR UTILIZING DELTA CONNECTED TRIGGERABLE BICONDUCTIVE DEVICES
3 Claims, 3 Drawing Figs.

[52] U.S. Cl. .................................................. 318/227, 318/230
[51] Int. Cl. ...................................................... H02p 5/40
[50] Field of Search ........................................... 318/227, 230

[56] References Cited
UNITED STATES PATENTS

| | | | |
|---|---|---|---|
| 2,579,574 | 12/1951 | Herchenroeder ............ | 318/227 |
| 3,345,549 | 10/1967 | Hauser et al. ................. | 318/227 |
| 3,376,485 | 4/1968 | Shibata et al. ................ | 318/227 |
| 3,387,196 | 6/1968 | Graham et al. ............... | 318/227 |

Primary Examiner—Oris L. Rader
Assistant Examiner—Gene Z. Rubinson
Attorneys—James C. Davis, Jr., Lawrence G. Norris, Melvin M. Goldenberg, Frank L. Neuhauser and Oscar B. Waddell ABSTRACT: A variable speed polyphase induction motor system features phase-controlled thyristors connected in full-wave delta in the neutral of a wye-connected motor.

INVENTORS
HERBERT J. BROWN
GEORGE M. ROSENBERRY, JR.
BY *James L. Davis Jr.*
THEIR ATTORNEY

INVENTORS
HERBERT J. BROWN
GEORGE M. ROSENBERRY, JR.

BY

THEIR ATTORNEY

SPEED CONTROL OF A WYE-CONNECTED INDUCTION MOTOR UTILIZING DELTA CONNECTED TRIGGERABLE BICONDUCTIVE DEVICES

This is a continuation of application Ser. No. 620,123 filed Mar. 2, 1967 and now abandoned.

BACKGROUND

Numerous combinations of phase-controlled thyristors in series with polyphase loads, including the windings of induction motors, have been proposed. These include: (1) the use of a thyristor in series with each of the three power leads to deliver controlled half-wave power, (2) the use of diodes to permit unrestricted bypassing of the aforementioned thyristors in the reverse direction to provide full-wave power with half-wave control, and (3) the use of additional thyristors to replace the aforementioned diodes to gain full-wave power and control. Various combinations of the foregoing in less than all three power leads also have been proposed.

In general, it has been found that half-wave power and half-wave controlled systems result in substantial extra motor losses, and unbalanced control systems produce a correspondingly undesirable unbalanced line and load condition and extra losses. Of the systems described, the full-wave power and full-wave control system represents the most promising one; however, there is need for a system of this kind wherein the current capacity of the thyristors is more effectively and fully utilized, in the interest of controlling motors of greater power with thyristors of a given rating.

OBJECTS

It is a principal object of this invention to provide an improved adjustable speed polyphase induction motor.

It is a further object of this invention to provide improved means for controlling the quantity of electric power supplied from a three-phase alternating-current source to a three-phase winding load.

It is another object to provide a polyphase adjustable speed induction motor utilizing phase-controlled thyristors of lesser current rating than would be required in systems heretofore known with a motor of similar rating.

BRIEF DESCRIPTION

In a preferred embodiment of the present invention, a triac, or an equivalent pair of back-to-back SCR's, is connected in each of the three legs of a delta and the neutral ends of the three phase windings of a wye-connected motor are respectively connected to the three points of the delta. Each of the triacs, or pairs of SCR's, is triggered symmetrically in respect to the line voltage applied to the two windings, the neutrals of which they connect. By varying the time delay, or phase angle, of triggering, the power input to the motor is correspondingly varied to provide torque or speed control. It has been found that this system permits smaller conduction angles in the solid-state devices and substantially reduced average current ratings thereof when compared with a full-wave system utilizing devices connected in series with the power lines and providing the same control for a given motor.

DRAWING

DETAILED DESCRIPTION

Figure 1:
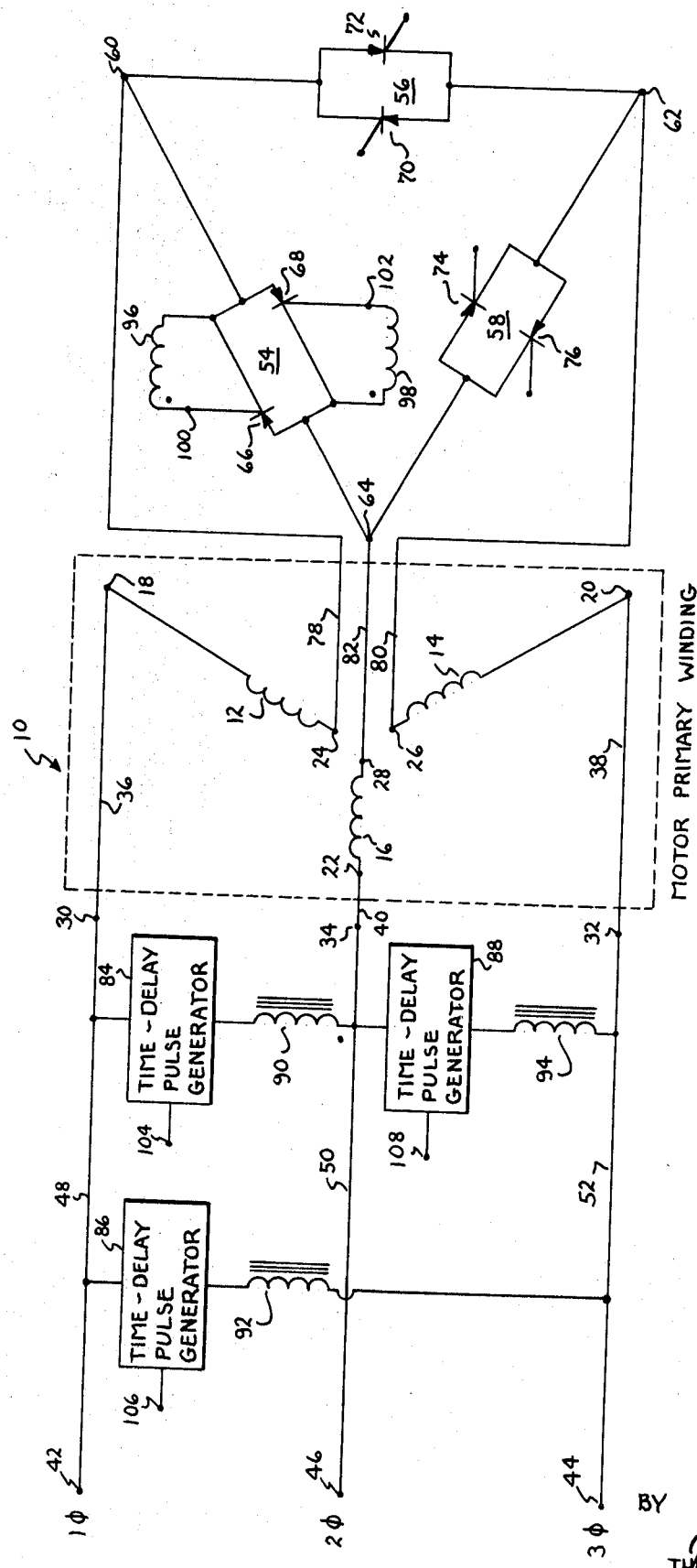
FIG. 1 is a schematic circuit diagram of a variable speed polyphase motor system in accord with the present invention.

The dashed-line rectangle 10 in FIG. I encloses a schematic representation of a dynamoelectric machine primary winding that in a typical case can be the stator winding of a conventional polyphase induction motor, for example. The primary winding illustrated comprises three phase windings 12, 14 and 16 that, in turn, can be subdivided into a plurality of series and/or parallel-connected components (not shown), all as is well known in the art. Phase windings 12, 14, and 16 include respective terminals, or line connection leads, 18, 20 and 22 at one extremity thereof and respective neutral terminals, or leads, 24, 26 and 28 at the other extremity thereof. External accessibility in a junction box or the like of both ends of phase windings is frequently provided in this way in dynamoelectric machines, particularly in motors of greater than fractional horsepower, in order to facilitate manual or automatic reconnection of the winding for different magnitude voltages and/or for motor starting with reduced magnitude initial current surges, for examples.

Line terminals 30, 32 and 34 are respectively connected to connecting leads 18, 20 and 22, as by respective conductors 36, 38 and 40, to adapt the primary winding to be connected to a conventional source of polyphase alternating-current power. In the illustration, such a source is represented by power bus terminals 42, 44 and 46, which are connected respectively to terminals 30, 32, and 34 by respective conductors 48, 50 and 52. The power line connection is only made directly to one end of windings 12, 14 and 16, in which case the dynamoelectric machine is referred to as wye-connected, or Y-connected, because of the orientation of the windings to each other in the usual schematic representations thereof.

In accord with the present invention, three bidirectionally conductive, triggerable semiconductive means 54, 56 and 58 are connected together in a closed-loop delta having three junctions, or delta points, designated at 60, 62 and 64. Semiconductive means that can be triggered, or fired, into the highly conductive state from a relatively nonconductive state in either polarity of conduction are available in a single device, as the well-known triac, for example, or each semiconductive means can comprise more than one device, as shown, in the form of two SCR's or the like connected in inverse-parallel, or back-to-back, relationship. In the illustrative embodiment, semiconductive means 54 includes SCR 66 and SCR 68 with the principal electrodes thereof connected in inverse-parallel relationship, i.e., the anode of SCR 66 and the cathode of SCR 68 are both connected to junction 64, and the cathode of SCR 66 and the anode of SCR 68 are both connected to junction 60. Similarly, SCR's 70 and 72 comprise semiconductive means 56 and SCR's 74 and 76 comprise semiconductive means 58, to form the other two sides of the delta.

Means are provided respectively connecting the three neutral terminals 24, 26 and 28 to the delta junctions 60, 62 and 64. In FIG. 1, such means are represented by conductors 78, 80 and 82, respectively. Thus, the neutral terminals 24, 26 and 28 are not connected together as in a conventional wye-connected machine, but are selectively electrically joined in pairs only by conduction of one or more of semiconductive means 54, 56 and 58.

In order to selectively establish conduction in the aforementioned semiconductive means, trigger means are provided coupled thereto. In FIG. 1, the trigger means comprise time-delay pulse generators 84, 86 and 88 which serve semiconductive means 54, 56 and 58, respectively. Toward this end, each of the pulse generators 84, 86 and 88 are illustrated schematically to be connected in series with a pulse transformer primary, designated at 90, 92 and 94, respectively, across the particular power bus terminals that supply the power to the windings, the neutrals of which, are joined by their correspondingly controlled semiconductive means. Coupling to the semiconductive means is effected, in the case of pulse generator 84, by secondary windings 96 and 98 of transformer 90. Winding 96 is connected from the cathode to the gate 100 of SCR 66 and winding 98 is coupled from the cathode to the gate 102 of SCR 68. Similar coupling of transformer primaries 92 and 94 is also effected, but is not shown to avoid congestion in the drawing. In many cases, the duration of time-delay is advantageously controlled in response to the magnitude of an electric control voltage or current, by any of a plurality of well-known means, and control signal input terminals 104, 106 and 108 schematically illustrate means adapted for such connection in pulse generators 84, 86 and 88, respectively.

Figure 2:
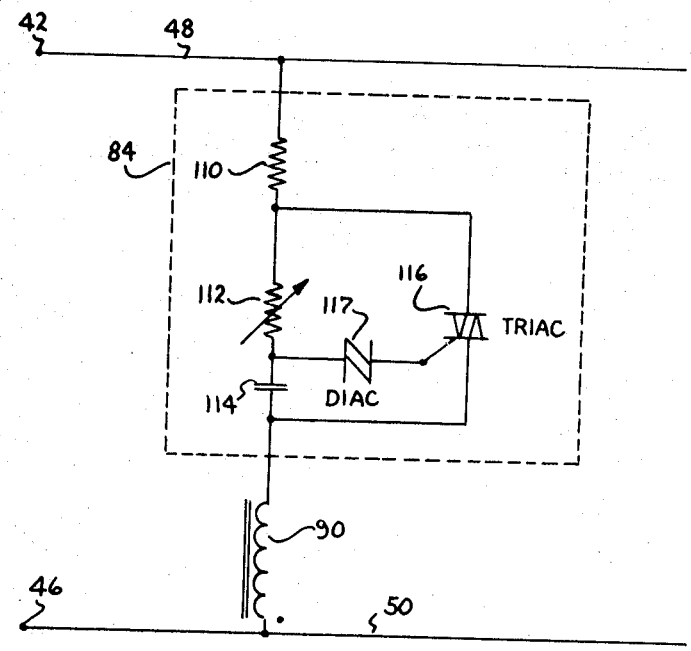
FIG. 2 is a schematic circuit diagram of a time-delay pulse generator suitable for use in the system of FIG. 1.

FIG. 2 illustrates a suitable time-delay pulse generator and comprises a current-limiting resistance 110, a variable resistance 112 (that could represent a control transistor, for example) and a capacitance 114 connected in series circuit together and in series with transformer primary 90 from bus 48 to bus 50. A triac 116 is connected in parallel with resistance 112 and capacitance 114 and the triac gate is connected to the junction of the latter two components by means of diac 117, or silicon bilateral switch, for example. Alternating positive and negative pulses are provided in primary 90 after capacitance 114 charges in the corresponding polarity to the breakover voltage of diac 116. The time required, after a voltage zero between lines 48 and 50, for the required charging to occur depends upon setting of resistance 112.

Many other firing circuits are known which are suitable for use in connection with this invention or can be readily adapted for such use. Of course, it is not required that the pulse transformer primaries be connected in series with the pulse generators, as illustrated. Alternating polarity pulses are not required because the semiconductive means can only become conductive in one direction at a time, depending upon the polarity of voltage thereacross at the time a trigger pulse is received. For other firing circuits, specific reference is hereby made to the "SCR Manual," third edition, published in 1964 by the assignee hereof, particularly the section commencing at page 130 therein entitles "Trigger Circuits for Phase Control." Unijunction transistor firing circuits are particularly useful, and many electronically variable time-delay, or phase shift, means therefor are well known.

Figure 3:
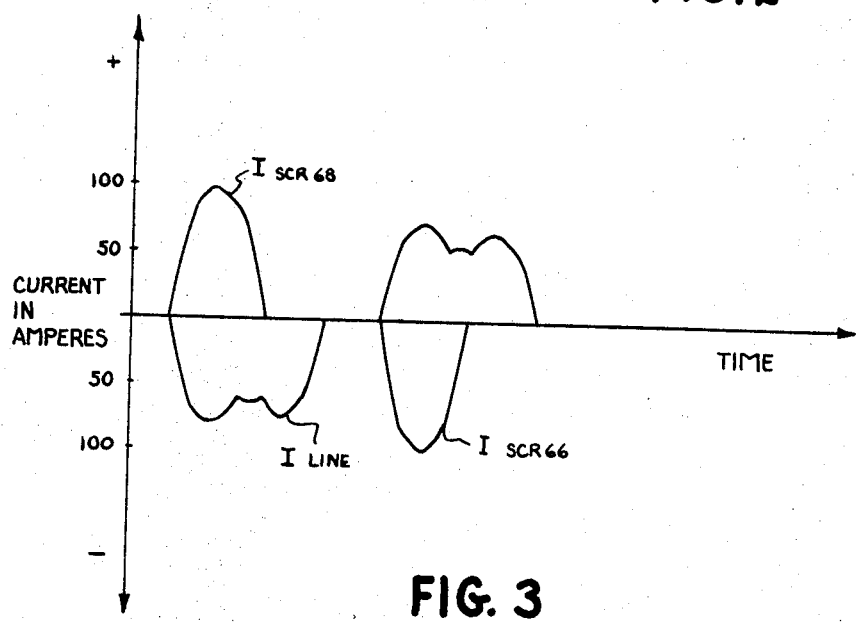
FIG. 3 is a plot of current versus time illustrating the relationship between the magnitude of line current and phase current in the system of FIG. 1.

FIG. 3 is a copy of an oscillogram taken from a system in accord with the invention and illustrating the magnitude of phase current and line current on the ordinate and time on the abscissa for one complete cycle. The motor was a three-phase, 50 horsepower induction machine turning at 1200 with a fan load of 86 ft.-lb. torque. With the motor-wye, SCR-delta system herein described, the total conduction angle of each SCR was 78° and the average current was 17.0 amperes. Under the same conditions of motor operation, a full-wave system with SCR's in series in the line showed a conduction angle for each SCR of 117° and an average current of 32.3 amperes. Thus, the average SCR current in accord with this invention is 53 percent of the value obtained with the usual inline connection. The peak current is approximately equal in each case, but in the system of this invention two SCR's, rather than one SCR, carry the motor line current each half cycle. Tests have shown that the required SCR voltage rating is the same for both cases. This means that a given set of SCR's can handle a motor of nearly twice as great horsepower in accord with the present invention.

Under typical operating conditions, as described above, in a full-wave system wherein the motor windings and SCR's were both in delta configuration, the stator losses were found to be 134 percent greater than in the motor-wye, SCR-delta system of this invention. The corresponding losses were 149 percent greater in the case of a half-wave system using three SCR's in a closed-loop delta.

While the invention is described in the illustrative setting of variable power polyphase induction motors, it will be apparent that the teaching herein extends to the general environment of controlling the quantity of polyphase power applied to a polyphase load having neutral leads, particularly in the case of polyphase transformer windings.

The foregoing is a description of an illustrative embodiment of the invention, and it is applicants' intention in the appended claims to cover all forms which fall within the scope of the invention.

We claim:
1. A dynamoelectric machine comprising:
 a. a polyphase winding having three line terminals and three neutral leads;
 b. three bidirectionally conductive and triggerable semiconductive means connected together in a closed-loop delta having three junctions;
 c. means respectively connecting said three neutral leads to said three junctions;
 d. means for connecting a three-phase power supply to said three line terminals; and
 e. trigger means coupled to said semiconductive means for selectively establishing conduction therein, said trigger means providing conduction initiating trigger pulses to predetermined ones of said bidirectionally conductive semiconductive means during the positive and negative half cycles of the three-phase energization waveform applied to each polyphase winding to produce current flow in opposite directions through sequential legs of said delta connected semiconductive means during alternate half cycles of sequential phases in said three-phase power supply and means for varying the phase relationship of said trigger pulses relative to the voltage at said line terminals to correspondingly vary the quantity of power supplied to said windings.

2. The machine of claim 1 wherein said trigger means comprises a variable time-delay pulse generator coupled to each of said semiconductive means and means synchronizing operation of said pulse generators with the voltage applied to the line terminals of the two-phase windings whose neutral leads are connectable by conduction of the respective semiconductive means to which said generators are coupled.

3. A variable speed polyphase induction motor comprising:
 a. a stator having first, second and third phase windings therein, each winding have two extremities;
 b. first bidirectionally conductive triggerable semiconductive means connected to one extremity of said first phase winding and to one extremity of said second phase winding, second bidirectionally conductive triggerable semiconductive means connected to said one extremity of said second phase winding and to one extremity of said third phase winding, and third bidirectionally conductive triggerable semiconductive means connected to said one extremity of said third phase winding and to said one extremity of said first phase winding, each of said semiconductive means being triggerable to establish the only path of current conduction between the winding extremities to which it is connected;
 c. means for energizing the second extremity of each of said windings with an individual phase of a three-phase power source,
 d. trigger means coupled to said semiconductive means for selectively establishing conduction in opposite directions in the semiconductive means connected to the opposite extremity of a phase winding during successive half cycles of the power source phase connected to the second extremity of the phase winding,
  said trigger means comprising a first trigger pulse generator coupled to said first semiconductive means and connected to the other extremities of said first and second phase windings, a second trigger pulse generator coupled to said second semiconductive means and connected to said other extremity of said second phase winding and to the other extremity of said third phase winding, and a third trigger pulse generator coupled to said third semiconductive means and connected to said other extremity of said first phase winding, each of said trigger pulse generators having a variable time delay to alter the phase relationship of said generated pulses relative to the voltage applied between the other extremities to which said pulse generators are connected.